United States Patent

Takeo

[11] Patent Number: 5,179,597
[45] Date of Patent: Jan. 12, 1993

[54] METHOD FOR DETERMINING AN IMAGE POINT IN AN OBJECT IMAGE

[75] Inventor: Hideya Takeo, Kanagawa, Japan

[73] Assignee: Fuji Photo Film Co., Ltd., Kanagawa, Japan

[21] Appl. No.: 340,744

[22] Filed: Apr. 20, 1989

[30] Foreign Application Priority Data

Apr. 20, 1988 [JP] Japan ............................. 63-97897
Feb. 8, 1989 [JP] Japan ............................. 1-29179

[51] Int. Cl.$^5$ .............................................. G06K 9/00
[52] U.S. Cl. ........................................ 382/41; 382/48; 382/51; 250/327.2
[58] Field of Search ............... 382/41, 48, 45, 28, 382/18, 51, 50; 250/327.2, 484.1; 356/21, 11; 358/107; 364/413.17, 463

[56] References Cited

U.S. PATENT DOCUMENTS

| | | | |
|---|---|---|---|
| 4,392,120 | 7/1983 | Mita et al. | 382/22 |
| 4,516,263 | 5/1985 | Dew et al. | 382/41 |
| 4,593,406 | 7/1986 | Stone | 382/44 |
| 4,701,807 | 10/1987 | Ogino | 382/50 |
| 4,806,756 | 2/1989 | Nakajima | 250/327.2 |
| 4,829,181 | 5/1989 | Shimura | 250/327.2 |
| 4,887,305 | 12/1989 | Shimura | 382/51 |

FOREIGN PATENT DOCUMENTS 0170270 7/1985 PCT Int'l Appl. .

OTHER PUBLICATIONS

"An Image Processing Method for Feature Extraction of Space-Occupying Lesions" *Journal of Nuclear Medicine*, vol. 26, No. 12, Dec. 1985, pp. 1472-1744, New York, N.Y. US; K. Homma et al.

Primary Examiner—Michael T. Razavi
Assistant Examiner—Yon Jung
Attorney, Agent, or Firm—Sughrue, Mion, Zinn, Macpeak & Seas

[57] ABSTRACT

A method for determining an image point in an object image comprises the steps of, on the basis of an image signal comprising image signal components representing image information at respective picture elements on a recording medium on which a radiation image including an object image has been recorded, weighting the respective picture elements with image signal values corresponding to the respective picture elements or with the reciprocals of the image signal values, thereby to find the center of gravity on the recording medium. A position, at which the center of gravity is located, is determined as the image point in the object image.

9 Claims, 7 Drawing Sheets

METHOD FOR DETERMINING AN IMAGE POINT IN AN OBJECT IMAGE

BACKGROUND OF THE INVENTION

1. Field of the Invention

This invention relates to a method for determining an image point in an object image on the basis of an image signal comprising image signal components representing image information at respective picture elements on a recording medium on which a radiation image including the object image has been recorded.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value designed so as to match the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, and by using the image signal the radiation image of the object is reproduced as a visible image on a recording material such as a photographic film, a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted upon stimulation after the radiation energy is stored on the stimulable phosphor varies over a wide range and is proportional to the amount of energy stored during exposure to the radiation, it is possible to obtain an image having a desirable density regardless of the energy intensity of the radiation to which the stimulable phosphor sheet was exposed, by setting an appropriate read-out gain when detecting the emitted light and converting it into an electric signal to be used in reproduction of a visible image on a recording material or a display device.

In order to detect an image signal accurately, certain factors which affect the image signal must be set in accordance with the dose of radiation delivered to the stimulable phosphor sheet and the like. A novel radiation image recording and reproducing system which accurately detects an image signal has been proposed in, for example, Japanese Unexamined Patent Publication Nos. 58(1983)-67240, 58(1983)-67241 and 58(1983)-67242. The proposed radiation image recording and reproducing system is constituted such that a preliminary read-out operation (hereinafter simply referred to as "preliminary read out") is carried out for approximately ascertaining the radiation image stored on the stimulable phosphor sheet. In the preliminary read out, the stimulable phosphor sheet is scanned with a light beam having a comparatively low energy level, and a preliminary read-out image signal obtained during the preliminary read out is analyzed. Thereafter, a final read-out operation (hereinafter simply referred to as "final read out") is carried out for obtaining the image signal, which is to be used during the reproduction of a visible image. In the final read out, the stimulable phosphor sheet is scanned with a light beam having an energy level higher than the energy level of the light beam used in the preliminary read out, and the radiation image is read out with the factors affecting the image signal adjusted to appropriate values on the basis of the results of an analysis of the preliminary read-out image signal.

The term "read-out condition" as used hereinafter means a group of various factors, which are adjustable and which affect the relationship between the amount of light emitted by the stimulable phosphor sheet during image read out and the output of a read-out means. For example, the term "read-out condition" may refer to a read-out gain and a scale factor which define the relationship between the input to the read-out means and the output therefrom, or the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary read out is or is not carried out, it has also been proposed to analyze the image signal (including the preliminary read-out image signal) obtained and to adjust an image processing condition, which is to be used when the image signal is processed, on the basis of the results of an analysis of the image signal. The proposed method is applicable to cases where an image signal is obtained from a radiation image recorded on a recording medium such as conventional X-ray film, as well as to the systems using stimulable phosphor sheets.

Various methods have been proposed for calculating how the read-out condition for final read out and/or the image processing condition should be adjusted on the basis of an analysis of the image signal (including the preliminary read-out image signal). As one of such methods, it has been proposed in, for example, Japanese Patent Application No. 59(1984)-12658 to create a histogram of the image signal. When a histogram of the image signal is created, the characteristics of a radiation image recorded on a recording medium such as a stimulable phosphor sheet or X-ray film can be ascertained based on, for example, the maximum value of the image signal, the minimum value of the image signal, or the value of the image signal at which the histogram is maximum, i.e. the value which occurs most frequently. Therefore, if the read-out condition for the final read out, such as the read-out gain or the scale factor, and/or the image processing condition such as the gradation processing condition or the frequency response processing condition is based on an analysis of the histogram of the image signal, it becomes possible to reproduce a visible image suitable for viewing, particularly for diagnostic purposes.

On the other hand, in the course of radiation image recording, it is often desirable for portions of the object not related to a diagnosis or the like to be prevented from being exposed to radiation. Further, when the object portions not related to a diagnosis or the like are exposed to radiation, the radiation is scattered by such portions to the portion that is related to a diagnosis or the like, and the image quality is adversely affected by the scattered radiation. Therefore, when a radiation image is recorded on the recording medium, an irradiation field stop is often used for limiting the irradiation field to an area smaller than the overall recording region of the recording medium so that radiation is irradiated only to that portion of the object which is to be viewed.

However, in cases where the read-out condition for the final read out and/or the image processing condition is calculated on the basis of the results of an analysis of the image signal in the manner described above and the image signal is detected from a recording medium, on which a radiation image has been recorded by limitation of the irradiation field, the radiation image cannot be ascertained accurately if the image signal is analyzed without the shape and location of the irradiation field being taken into consideration. As a result, an incorrect read-out condition and/or an incorrect image processing condition is set, so that a visible radiation image suitable for viewing, particularly for diagnostic purposes, cannot be reproduced.

In order to eliminate the aforesaid problem, it is necessary to recognize the shape and location of an irradiation field and then to calculate the read-out condition for the final read out and/or the image processing condition on the basis of only the image signal representing image information stored in the region inside of the irradiation field.

Accordingly, the applicant has proposed in, for example, Japanese Patent Application No. 62(1987)-93633 a novel method capable of accurately recognizing an irradiation field even when the irradiation field has an irregular shape. The proposed method comprises the steps of detecting a prospective contour point, which is considered to be present on a contour of the irradiation field, along each of a plurality of radial directions each of which extends from a predetermined point located in the region inside of the irradiation field to an edge of a recording medium, and recognizing a region surrounded by lines connecting the thus detected prospective contour points as the irradiation field.

In the proposed method for recognizing an irradiation field, the aforesaid predetermined point should be located in the region inside of the irradiation field, and should preferably be located in an object image formed in the region inside of the irradiation field. In cases where the image recording is carried out with an irradiation field stop, since the irradiation field stop is used to limit the irradiation field so that an image of only that portion of the object which is to be viewed is recorded, the image points in the region inside of the irradiation field (particularly, the image points at positions neighboring the center point of the irradiation field) are generally located in the region inside of the object image.

In cases where the irradiation field is first detected and then the image signal representing the image information recorded in the region inside of the detected irradiation field is analyzed in the manner as that described above, an appropriate read-out condition and/or an appropriate image processing condition is determined.

However, in order to recognize an irradiation field with the method proposed in Japanese Patent Application No. 62(1987)-93633, it is necessary to find an image point located in the region inside of the irradiation field (preferably, an image point located in the region inside of the object image).

Figure 5A:
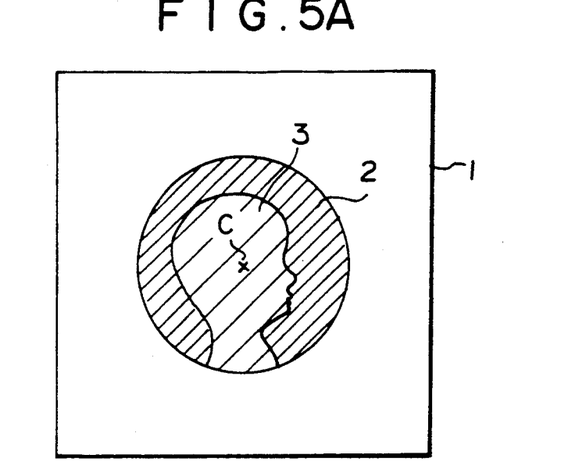
FIG. 5A is a schematic view showing an example wherein the irradiation field is located at the center portion of a recording medium.

One approach is to determine the center point of the recording medium as the image point located in the region inside of the irradiation field (an image point located in the region inside of the object image). For example, as shown in FIG. 5A, in cases where an irradiation field 2 is present at the center portion of a recording medium 1, the center point C of the recording medium 1 is one of the image points located in the region inside of the irradiation field 2. In most cases, the center point C of the recording medium 1 is one of the image points located in the region inside of an object image 3.

Figure 5B:
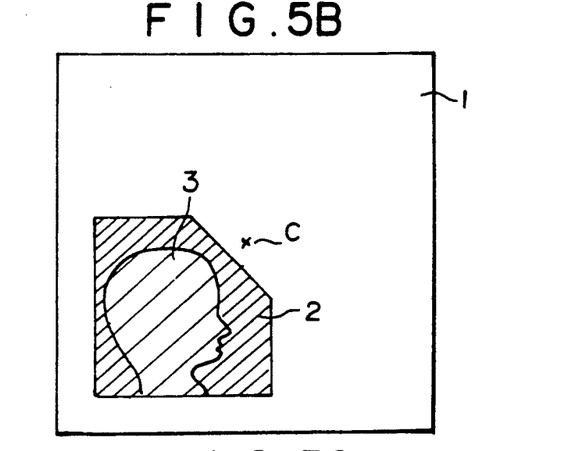
FIG. 5B is a schematic view showing an example wherein the irradiation field is deviated from the center portion of a recording medium.
Figure 5C:
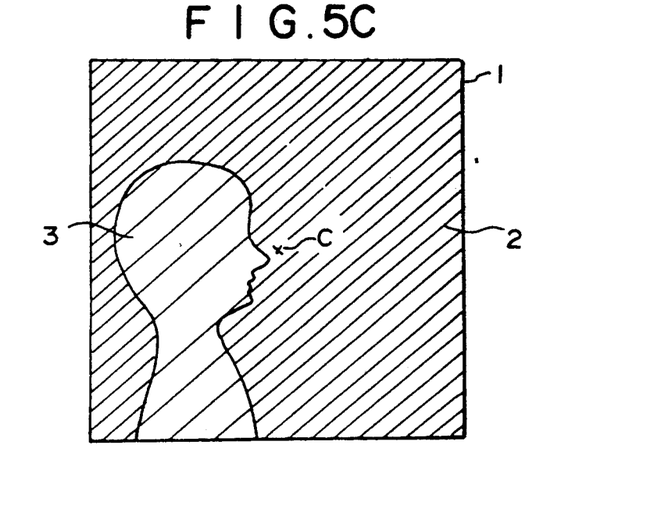
FIG. 5C is a schematic view showing an example wherein a radiation image was recorded without an irradiation field stop being used and the irradiation field extends over the overall area of a recording medium.

However, as shown in FIG. 5B, in cases where the irradiation field is deviated from the center point C of the recording medium 1, an image point in the region inside of the irradiation field 2 cannot be found with the aforesaid method. Also, as shown in FIG. 5C, in cases where the image recording was carried out without the irradiation field stop being used, all positions on the recording medium 1 including the center point C of the recording medium 1 are the image points located in the region inside of the irradiation field 2. However, in this case, no irradiation field stop was used, and the probability of the object image 3 being deviated from approximately the center point of the irradiation field 2 (which center point coincides with the center point C of the recording medium 1 in this example) is higher than when the image recording was carried out with the irradiation field being limited as shown in FIGS. 5A and 5B. Therefore, the center point C of the recording medium does not necessarily constitute one of the image points located in the region inside of the object image.

The image point located in the region inside of the object image should be determined when the irradiation field is to be recognized as described above, and when which position on a radiation image is to be employed as the center point of a visible image is determined in cases where, for example, part of the radiation image is enlarged and reproduced into the visible image.

SUMMARY OF THE INVENTION

The primary object of the present invention is to provide a method for determining an image point in an object image included in a radiation image which has been recorded with or without an irradiation field stop.

The present invention provides a first method for determining an image point in an object image, which comprises the steps of:

i) on the basis of an image signal comprising image signal components representing image information at respective picture elements on a recording medium (such as a stimulable phosphor sheet or photographic film) on which a radiation image including an object image has been recorded, weighting the respective picture elements with image signal values corresponding to the respective picture elements or with the reciprocals of said image signal values, thereby to find the center of gravity on said recording medium, and ii) determining a position, at which said center of gravity is located, as the image point in said object image.

The present invention also provides a second method for determining an image point in an object image, which comprises the steps of:

i) on the basis of an image signal comprising image signal components representing image information at respective picture elements on a recording medium (such as a stimulable phosphor sheet or photographic film) on which a radiation image including an object image has been recorded, arraying image signal values corresponding to the respective picture elements or the reciprocals of said image signal values so that the positions of said image signal values or the positions of said reciprocals of said image signal values coincide with the positions of the corresponding picture elements, ii) cumulating said image signal values or said reciprocals of said image signal values along each of two different directions on said recording medium, and plotting the resulting cumulative values of said image signal values or the resulting cumulative values of said reciprocals of said image signal values along each of said two different directions, thereby to find the distributions of the cumulative values along said two different directions, iii) detecting a coordinate point along each of said two different directions, at which point the cumulative value is approximately one half of the maximum cumulative value, from each of said distributions of the cumulative values, and iv) determining a position on said recording medium, which position is defined by the coordinate points detected along said two different directions, as the image point in said object image.

The present invention also provides a third method for determining an image point in an object image, which comprises the steps of:

i) on the basis of an image signal comprising image signal components representing image information at respective picture elements on a recording medium on which a radiation image including an object image has been recorded, weighting the respective picture elements with image signal values corresponding to the respective picture elements or with the reciprocals of said image signal values, thereby to find the center of gravity on said recording medium, ii) judging whether or not the image signal value at said center of gravity is within the range of the image signal values which represent the substantial object image, and iii) when it is within said range, determining said center of gravity as the image point in said object image.

The present invention further provides a fourth method for determining an image point in an object image, which comprises the steps of:

i) on the basis of an image signal comprising image signal components representing image information at respective picture elements on a recording medium on which a radiation image including an object image has been recorded, arraying image signal values corresponding to the respective picture elements or the reciprocals of said image signal values so that the positions of said image signal values or the positions of said reciprocals of said image signal values coincide with the positions of the corresponding picture elements, ii) cumulating said image signal values or said reciprocals of said image signal values along each of two different directions on said recording medium, and plotting the resulting cumulative values of said image signal values or the resulting cumulative values of said reciprocals of said image signal values along each of said two different directions, thereby to find the distributions of the cumulative values along said two different directions, iii) detecting a coordinate point along each of said two different directions, at which point the cumulative value is approximately one half of the maximum cumulative value, from each of said distributions of the cumulative values, and iv) determining a position on said recording medium, which position is defined by the coordinate points detected along said two different directions, as the temporary image point, v) judging whether or not the image signal value at said temporary image point is within the range of the image signal values which represent the substantial object image, and vi) when it is within said range, determining said temporary image point as the image point in said object image.

In the first to fourth methods for determining an image point in an object image in accordance with the present invention, whether to use the image signal values or the reciprocals of the image signal values may be determined in the manner described below. After said image signal is detected, calculations are made based on said image signal to find a first representative value which is representative of the image signal values corresponding to the peripheral portion of said recording medium, and a second representative value which is representative of the image signal values corresponding to the overall area of said recording medium or corresponding to approximately the center portion of said recording medium. Said first representative value and said second representative value are compared with each other, and whether to use the image signal values or the reciprocals of the image signal values is selected in accordance with the results of the comparison.

The present invention further provides a fifth method for determining an image point in an object image, which comprises the steps of:

i) on the basis of an image signal comprising image signal components representing image information at respective picture elements on a recording medium on which a radiation image including an object image has been recorded, finding a candidate point which has a high possibility of being a point in said object image, ii) judging whether or not the image signal value at said candidate point is within the range of the image signal values which represent the substantial object image, and iii) when it is within said range, determining said candidate point as the image point in said object image.

The term "image signal comprising image signal components representing image information at respective picture elements on a recording medium" as used herein embraces, for example, an image signal obtained from a read-out operation wherein light emitted by a stimulable phosphor sheet when it is exposed to stimulating rays is detected photoelectrically, and an image signal obtained from a read-out operation wherein light which has passed through a photographic film or is reflected therefrom is detected photoelectrically.

The term "image signal values" as used herein means the values of the image signal components corresponding to the respective picture elements.

The first representative value, which is representative of the image signal values corresponding to the peripheral portion of the recording medium, need not necessarily be based on all image signal which corresponds to the overall area of the peripheral portion of the recording medium. The first representative value may vary within the range of values which may be regarded as being representative of the values of the image signal which corresponds to the peripheral portion of the recording medium. Specifically, the first representative value may be calculated on the basis of the image signal which corresponds to part of the peripheral portion of the recording medium insofar as the first representative value thus calculated can be regarded as being representative of the values of the image signal which corresponds to the peripheral portion of the recording medium.

The second representative value, which is representative of the values of the image signal corresponding to the overall area of the recording medium or approximately the center portion of the recording medium, need not necessarily be based on all image signal which corresponds to the overall area of the recording medium or approximately the center portion of the recording medium. The second representative value may vary within the range of values which may be regarded as being representative of the values of the image signal which corresponds to the overall area of the recording medium or approximately the center portion of the recording medium. Specifically, the second representative value may be calculated on the basis of the image signal which corresponds to approximately the overall area of the recording medium or to a region having a predetermined area approximately around the center point of the recording medium.

The first representative value and the second representative value may each be, for example, the mean value of the corresponding image signal, the median value of the corresponding image signal, the value of the formula expressed as (maximum value of the corresponding image signal +minimum value of the corresponding image signal)/2, or the value of the image signal corresponding to a cumulative value determined from a cumulative probability density function (e.g. curve B shown in FIG. 2C) which represents cumulative values of frequencies of occurrence of respective values of the corresponding image signal. The first representative value and the second representative value need not necessarily be calculated with the same operating process. For example, both of them need not necessarily be mean values.

The term "range of the image signal values which represent the substantial object image" can be, for example, determined in a hystogram of the image signal values corresponding to the respective picture elements as a range between two values that are inwardly different from the maximum value (Smax) and the minimum value (Smin) of the hystogram by a predetermined rate, that is 10% to 20% of the whole range covered by the hystogram.

With the first method for determining an image point in an object image in accordance with the present invention, the respective picture elements are weighted with image signal values corresponding to the respective picture elements or with the reciprocals of the image signal values, thereby to find the center of gravity on the recording medium. Therefore, a position at which the center of gravity is located can be determined with a substantially high probability as the image point in the object image.

With the second method for determining an image point in an object image in accordance with the present invention, image signal values corresponding to the respective picture elements or the reciprocals of the image signal values are arrayed so that the positions of the image signal values or the positions of the reciprocals of the image signal values coincide with the positions of the corresponding picture elements. Thereafter, the image signal values or the reciprocals of the image signal values are cumulated along each of two different directions on the recording medium, and the resulting cumulative values of the image signal values or the resulting cumulative values of the reciprocals of the image signal values are plotted along each of the two different directions, thereby to find the distributions of the cumulative values along the two different directions. A coordinate point along each of the two different directions, at which point the cumulative value is approximately one half of the maximum cumulative value, is then detected from each of the distributions of the cumulative values. Therefore, a position on the recording medium, which position is defined by the coordinate points detected along the two different directions, can be determined with a substantially high probability as the image point in the object image.

With the third to fifth methods for determining an image point in an object image in accordance with the present invention, it is judged whether or not the image signal value at said candidate point such as the center of gravity or temporary image point is within the range of the image signal values which represent the substantial object image, and only when it is judged to be within said range the candidate point is determined to be the image point in the object image. Therefore, the image point in the object image can be determined with a fairly high probability.

Further, since the candidate point may be obtained by any other method which is useful to temporarily find out an image point that may be in the object image with a high probability, this invention to determine the image point in the object image with high accuracy is broadly applicable to various method.

In the first to fourth methods for determining an image point in an object image in accordance with the present invention, whether to use the image signal values or the reciprocals of the image signal values varies depending on whether the radiation image was recorded over a narrow area on the recording medium limited by an irradiation field stop during the image recording or was recorded over a wide area on the recording medium with or without the irradiation field stop being used. Whether to use the image signal values or the reciprocals of the image signal values also varies depending on whether the radiation image recorded on the recording medium is a negative image or a positive image. Therefore, whether to use the image signal values or the reciprocals of the image signal values may be selected directly based on information about the area over which the radiation image is recorded or information about the type (negative or positive) of the radiation image each time the radiation image is recorded or read out. However, in cases where only either one of negative and positive images is processed or in cases where no distinction need be made between negative and positive images, for example, when the stimulable phosphor sheet is used as the recording medium, whether the radiation image was recorded over a narrow area on the recording medium limited by an irradiation field stop during the image recording or was recorded over a wide area on the recording medium with or without the irradiation field stop being used can be judged with the operations described below. Specifically, calculations are made to find a first representative value which is representative of the image signal values corresponding to the peripheral portion of the recording medium, and a second representative value which is representative of the image signal values corresponding to the overall area of the recording medium or corresponding to approximately the center portion of the recording medium. The first representative value and the second representative value are then compared with each other. In accordance with the results of the comparison, whether to use the image signal values or the reciprocals of the image signal values is selected. The image point in the object image can then be determined with the first or second method in accordance with the present invention wherein the image signal values or their reciprocals thus selected are used.

DESCRIPTION OF THE PREFERRED EMBODIMENTS

The present invention will hereinbelow be described in further detail with reference to the accompanying drawings.

Figure 1:
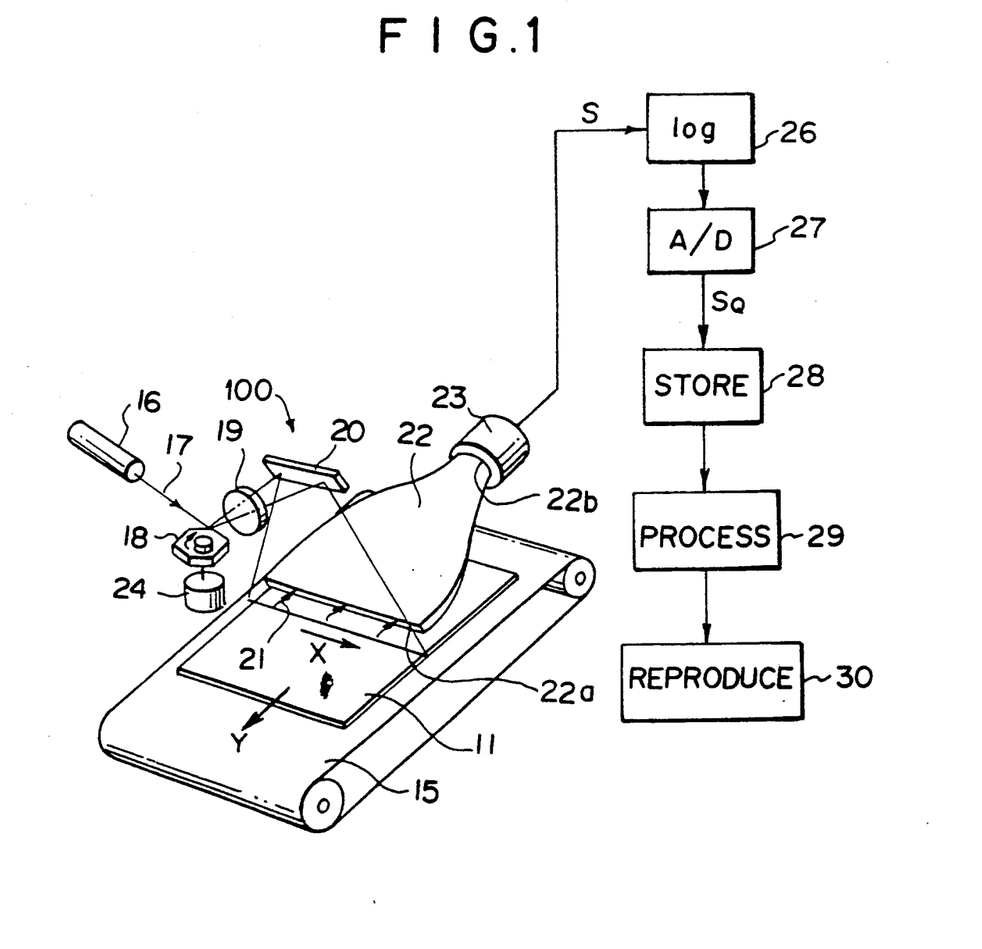
FIG. 1 is a perspective view showing an example of the radiation image read-out and reproducing apparatus wherein an embodiment of the method for determining an image point in an object image in accordance with the present invention is employed.

With reference to FIG. 1, a radiation image read-out and reproducing apparatus, wherein an embodiment of the method for determining an image point in an object image in accordance with the present invention is employed, utilizes a stimulable phosphor sheet.

A stimulable phosphor sheet 11 on which a radiation image has been stored is placed at a predetermined position in a read-out means 100. The stimulable phosphor sheet 11 is conveyed in a sub-scanning direction indicated by the arrow Y by a sheet conveyance means 15 which is constituted of an endless belt or the like and which is operated by an operating means (not shown). On the other hand, a laser beam 17 produced by a laser beam source 16 is reflected and deflected by a rotating polygon mirror 18 which is being quickly rotated by a motor 24 in the direction indicated by the arrow, and caused to pass through a converging lens 19 constituted of an $f\theta$ lens or the like. The direction of the optical path of the laser beam 17 is then changed by a mirror 20, and the laser beam 17 is caused to impinge upon the stimulable phosphor sheet 11 and scan it in a main scanning direction indicated by the arrow X, which direction is approximately normal to the sub-scanning direction indicated by the arrow Y. When the stimulable phosphor sheet 11 is exposed to the laser beam 17, the exposed portion of the stimulable phosphor sheet 11 emits light 21 in an amount proportional to the amount of energy stored thereon during exposure to radiation. The emitted light 21 is guided by a light guide member 22, and photoelectrically detected by a photomultiplier 23. The light guide member 22 is made by the forming of a light guiding material such as an acrylic plate, and has a linear light input face 22a positioned to extend along the main scanning line on the stimulable phosphor sheet 11, and a ring-shaped light output face 22b positioned so that it is in close contact with a light receiving face of the photomultiplier 23. The emitted light 21 which has entered the light guide member 22 from its light input face 22a is guided through repeated total reflection inside of the light guide member 22, emanates from the light output face 22b, and is received by the photomultiplier 23. In this manner, the amount of the emitted light 21 carrying the radiation image is converted into an electric signal by the photomultiplier 23.

An analog output signal S generated by the photomultiplier 23 is logarithmically amplified by a logarithmic amplifier 26, and digitized by an A/D converter 27 into an image signal SQ which comprises image signal components corresponding to the picture elements of the radiation image. The image signal SQ thus obtained is stored in a storage means 28, and then read therefrom by an image processing means 29.

The image processing means 29 determines an image point located in the object image. Along each of a plurality of radial directions each of which extends from the determined image point to an edge of the stimulable phosphor sheet 11, the image processing means 29 detects a prospective contour point, which is considered to be present on a contour of the irradiation field on the stimulable phosphor sheet 11, on the basis of the components of the image signal SQ corresponding to the picture elements arrayed along each direction. Thereafter, the image processing means 29 recognizes the region surrounded by the lines, which connect the prospective contour points thus detected, as the irradiation field. After recognizing the irradiation field, the image processing means 29 carries out appropriate image processing on the image signal SQ corresponding to the region inside of the irradiation field.

After being image processed, the image signal SQ is fed into a reproduction means 30 which reproduces a visible image from the image signal SQ.

How the image processing means 29 determines the image point in the object image on the basis of the image signal SQ will be described hereinbelow.

For simplicity of explanation, the values of the image signal components of the image signal SQ will hereinbelow be also denoted by SQ. The image processing means 29 weights the respective picture elements with the image signal values SQ corresponding to the respective picture elements or with the reciprocals 1/SQ of image signal values SQ, thereby to find the center of gravity on the stimulable phosphor sheet 11, and determines a position, at which the center of gravity is located, as the image point in the object image.

In order to carry out the operations for finding the center of gravity on the stimulable phosphor sheet 11, it is necessary to determine whether to use the image signal values SQ or the reciprocals 1/SQ of the image signal values SQ in the operations. In this embodiment, light emitted by the stimulable phosphor sheet 11 approximately in proportion to the amount of energy stored thereon during exposure to radiation is detected, so that no distinction need be made between negative and positive images. Therefore, whether to use the image signal values SQ or the reciprocals 1/SQ of the image signal values SQ is determined in accordance with whether the radiation image was recorded over a narrow area on the stimulable phosphor sheet 11 limited by an irradiation field stop during the image recording or was recorded over a wide area on the stimulable phosphor sheet 11 with or without the irradiation field stop being used. The information about the irradiation field may be entered to the image processing means 29 from an input means such as a keyboard (not shown) each time the image recording is carried out. However, in this embodiment, the radiation image read-out and reproducing apparatus automatically determines in the manner described below whether to use the image signal values SQ or the reciprocals 1/SQ of the image signal values SQ.

Figure 2A:
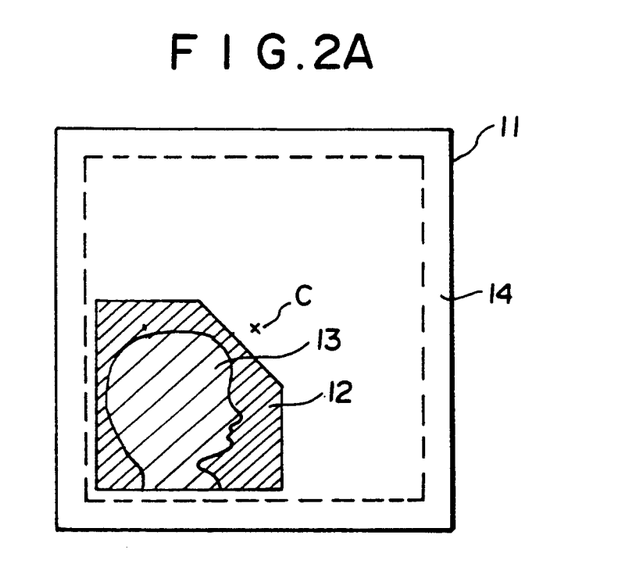
FIG. 2A is a schematic view showing an example wherein radiation was irradiated to a narrow area on a stimulable phosphor sheet.
Figure 2B:
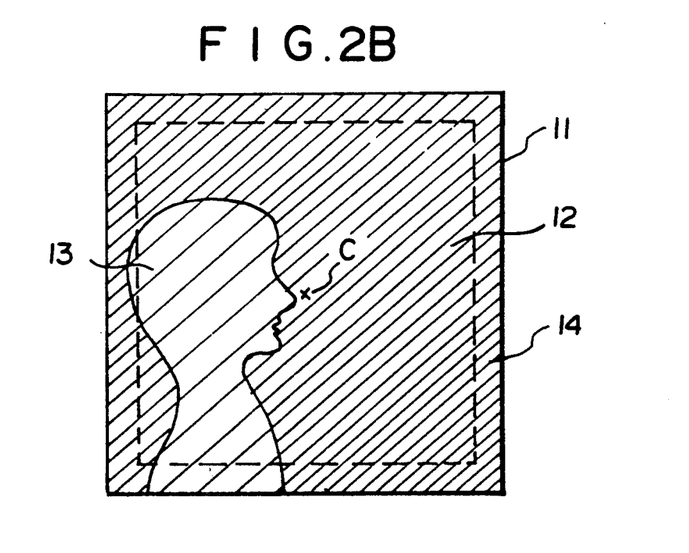
FIG. 2B is a schematic view showing an example wherein radiation was irradiated to the overall area on a stimulable phosphor sheet.

FIG. 2A is a schematic view showing an example wherein the image recording was carried out with an irradiation field stop, and radiation was irradiated only to a narrow area on a stimulable phosphor sheet 11. FIG. 2B is a schematic view showing an example wherein the image recording was carried out without an irradiation field stop being used, and radiation was irradiated to the overall area on a stimulable phosphor sheet 11.

In FIG. 2A, the region outside of an irradiation field 12 was exposed to little radiation, and therefore the image signal values SQ corresponding to the picture elements located in said region takes very small values. In each of FIGS. 2A and 2B, the region outside of an object image 13 in the region inside of the irradiation field 12 is the region upon which the radiation impinged directly without passing through the object (or without being reflected by the object). Therefore, the image signal values SQ corresponding to the picture elements located in the region outside of the object image 13 in the region inside of the irradiation field 12 takes very large values. The region inside of the object image 13 was exposed to the radiation which has passed through the object, and therefore the image signal values SQ corresponding to the picture elements located in the region inside of the object image 13 takes middle values.

A first representative value which is representative of the values of the image signal corresponding to the region (peripheral portion) 14 shown in FIG. 2A or 2B is calculated from the image signal corresponding to the picture elements located in the region 14. As the first representative value, the mean value of the image signal corresponding to the region 14 is employed. Also, a second representative value which is representative of the whole radiation image stored on the stimulable phosphor sheet 11 is calculated from the image signal corresponding to the overall area of the stimulable phosphor sheet 11.

How the second representative value may be calculated will be described hereinbelow with reference to FIG. 2C.

Figure 2C:
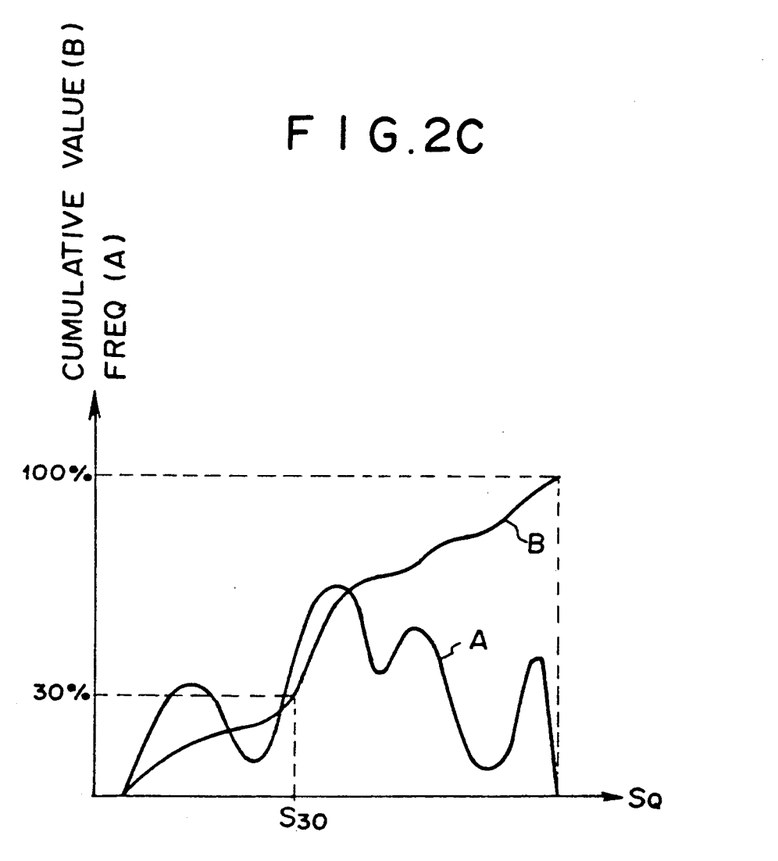
FIG. 2C is a graph showing examples of the probability density function (A) and the cumulative probability density function (B) of an image signal SQ corresponding to the overall area on a stimulable phosphor sheet.

FIG. 2C is a graph showing examples of the probability density function (curve A) and the cumulative probability density function (curve B) of the image signal values SQ corresponding to the overall area of the stimulable phosphor sheet 11. The horizontal axis represents the image signal values SQ. As for the curve A, the vertical axis represents the frequencies of occurrence of the respective values of the image signal SQ. As for the curve B, the vertical axis represents the cumulative value (%) of the frequencies indicated by the curve A.

In order to calculate the second representative value, the cumulative probability density function shown in FIG. 2C is created, and the value S30 of the image signal corresponding to the cumulative value of 30% is found from the cumulative probability density function. The value 30% is taken as the second representative value.

Thereafter, the first representative value and the second representative value thus calculated are compared with each other. As described above, the first representative value is the mean value of the image signal values SQ corresponding to the region 14. In the radiation image shown in FIG. 2A, the radiation was prevented by an irradiation field stop from impinging upon the region 14, and therefore the mean value of the image signal corresponding to the region 14 is small. In the radiation image shown in FIG. 2B, the radiation impinged upon the region 14 directly without passing through the object or without being reflected by the object, and therefore the mean value of the image signal corresponding to the region 14 is large. The second representative value approximates the median value between the first representative value in FIG. 2A and the first representative value in FIG. 2B.

Therefore, when the first representative value is smaller than the second representative value, it is judged that the irradiation field stop was used and the radiation image was recorded over a limited area on the stimulable phosphor sheet 11. In this case, it is decided that the image signal values SQ be used for the determination of the image point located in the object image. On the other hand, when the first representative value is larger than the second representative value, it is judged that the radiation image was recorded over a wide area on the stimulable phosphor sheet 11 with or without the irradiation field stop being used. In this case, it is decided that the reciprocals 1/SQ of the image signal values SQ be used for the determination of the image point located in the object image.

Figure 3A:
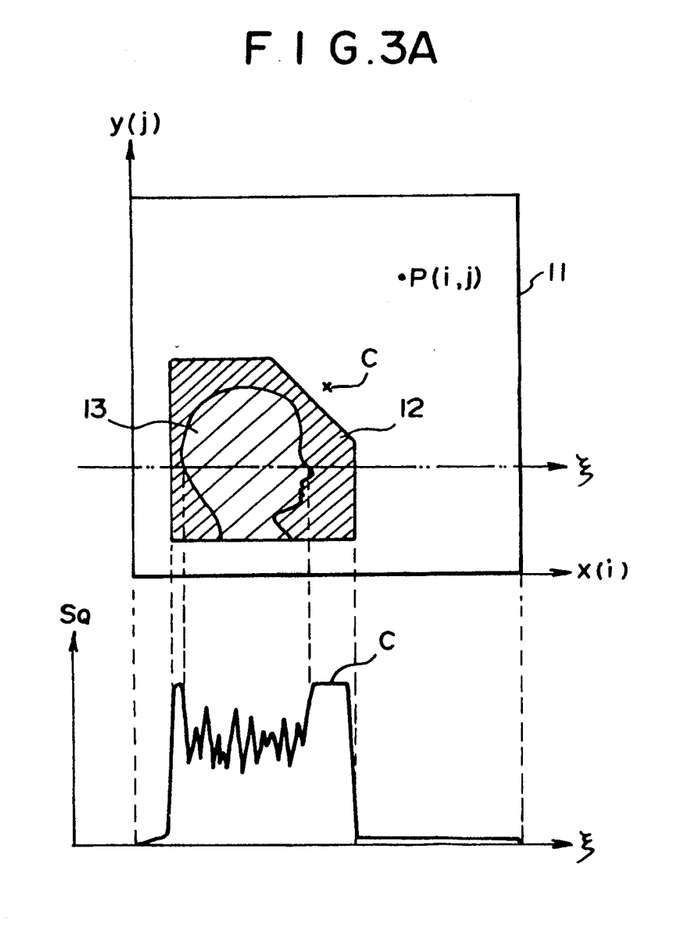
FIG. 3A is an explanatory view showing a radiation image and a graph of the image signal values SQ representing the radiation image.
Figure 3B:
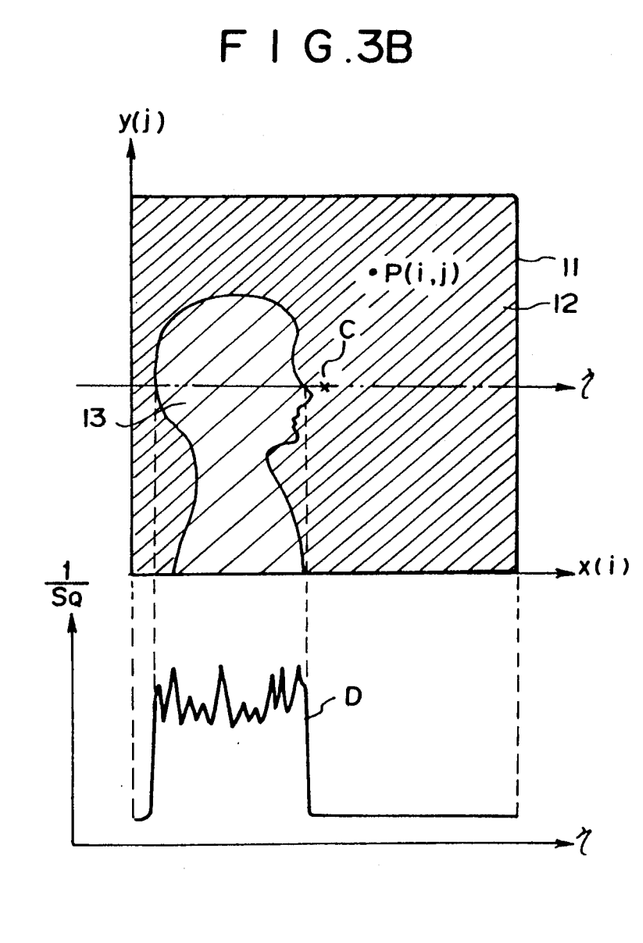
FIG. 3B is an explanatory view showing a radiation image and a graph of the reciprocals 1/SQ of the image signal values SQ representing the radiation image.

FIG. 3A is an explanatory view showing a radiation image of FIG. 2A and a graph of the image signal values SQ representing the radiation image. FIG. 3B is an explanatory view showing a radiation image of FIG. 2B and a graph of the reciprocals 1/SQ of the image signal values SQ representing the radiation image.

FIG. 3A corresponds to the radiation image shown in FIG. 2A wherein the irradiation field 12 is formed over a small area on the stimulable phosphor sheet 11. As indicated by curve C, when the image signal values SQ corresponding to the picture elements arrayed along the straight line $\xi$ are plotted, the image signal corresponding to the picture elements located in the region inside of the irradiation field 12 takes large values. Therefore, the picture elements are weighted with the corresponding image signal values SQ in order to find the center of gravity, and the position at which the center of gravity is located is determined as the image point in the region inside of the irradiation field 12. Also, since the irradiation field stop was used to limit the irradiation field so that an image of only that portion of the object which is to be viewed is recorded, the position at which the center of gravity is located is determined with a substantially high accuracy as the image point in the object image 13.

FIG. 3B corresponds to the radiation shown in FIG. 2B wherein the irradiation field 12 extends over the overall area of the stimulable phosphor sheet 11. As indicated by curve D, when the reciprocals 1/SQ of the image signal values SQ corresponding to the picture elements arrayed along the straight line $\eta$ are plotted, the reciprocals 1/SQ of the image signal values SQ corresponding to the picture elements in the region inside of the object image 13 takes large values. Therefore, the picture elements are weighted with the corresponding reciprocals 1/SQ in order to find the center of gravity, and the position at which the center of gravity is located is determined as the image point in the object image 13.

Specifically, the operations described below are carried out to weight the picture elements with the image signal values SQ or with the reciprocals 1/SQ of the image signal values SQ, thereby to find the center of The coordinates of the picture elements arrayed along the x direction are denoted by i (positive integers), and the coordinates of the picture elements arrayed along the y direction are denoted by j (positive integers). The image signal values SQ or the reciprocals 1/SQ of the image signal values SQ corresponding to the picture elements having the coordinates (i,j) are denoted by P(i,j). Also, Px(j) and Py(i) are expressed as $$Px(j) = {}_i\Sigma P(i,j) \tag{1}$$

$$Py(i) = {}_j\Sigma P(i,j) \tag{2}$$

The coordinates of the center of gravity along the x direction and the center of gravity along the y direction are denoted respectively by xc and yc. Then, the coordinates (xc,yc) of the center of gravity are calculated with the formulas expressed as $$Xc = \frac{\sum\limits_i i \cdot Py(i)}{\sum\limits_i Py(i)} \tag{3}$$

$$Yc = \frac{\sum\limits_j j \cdot Px(j)}{\sum\limits_j Px(j)} \tag{4}$$

Alternatively, the image processing means 29 shown in FIG. 1 may carry out the operations described below. Specifically, the image signal values SQ or the reciprocals 1/SQ of the image signal values SQ are arrayed so that their positions coincide with the positions of the corresponding picture elements. The image signal values SQ or the reciprocals 1/SQ of the image signal values SQ are cumulated along each of two different directions (the x and y directions in this example) on the stimulable phosphor sheet 11. The resulting cumulative values of the image signal values SQ or the resulting cumulative values of the reciprocals 1/SQ of the image signal values SQ are plotted along each of the x and y directions, thereby to find the distributions of the cumulative values along the x and y directions. From the distributions of the cumulative values, the coordinate points xc' and yc' along the x and y directions, at each of which points the cumulative value is approximately one half of the maximum cumulative value, are detected. The position having the coordinates (xc',yc') on the stimulable phosphor sheet 11, which position is defined by the coordinate points xc' and yc' detected along the x and y directions, is determined as the image point in the object image.

For explanation of the operations described above, FIG. 4 is an explanatory view showing examples of the distributions of the image signal values along the x and y directions, and the distributions of the cumulative values of the image signal values along the x and y directions.

Figure 4:
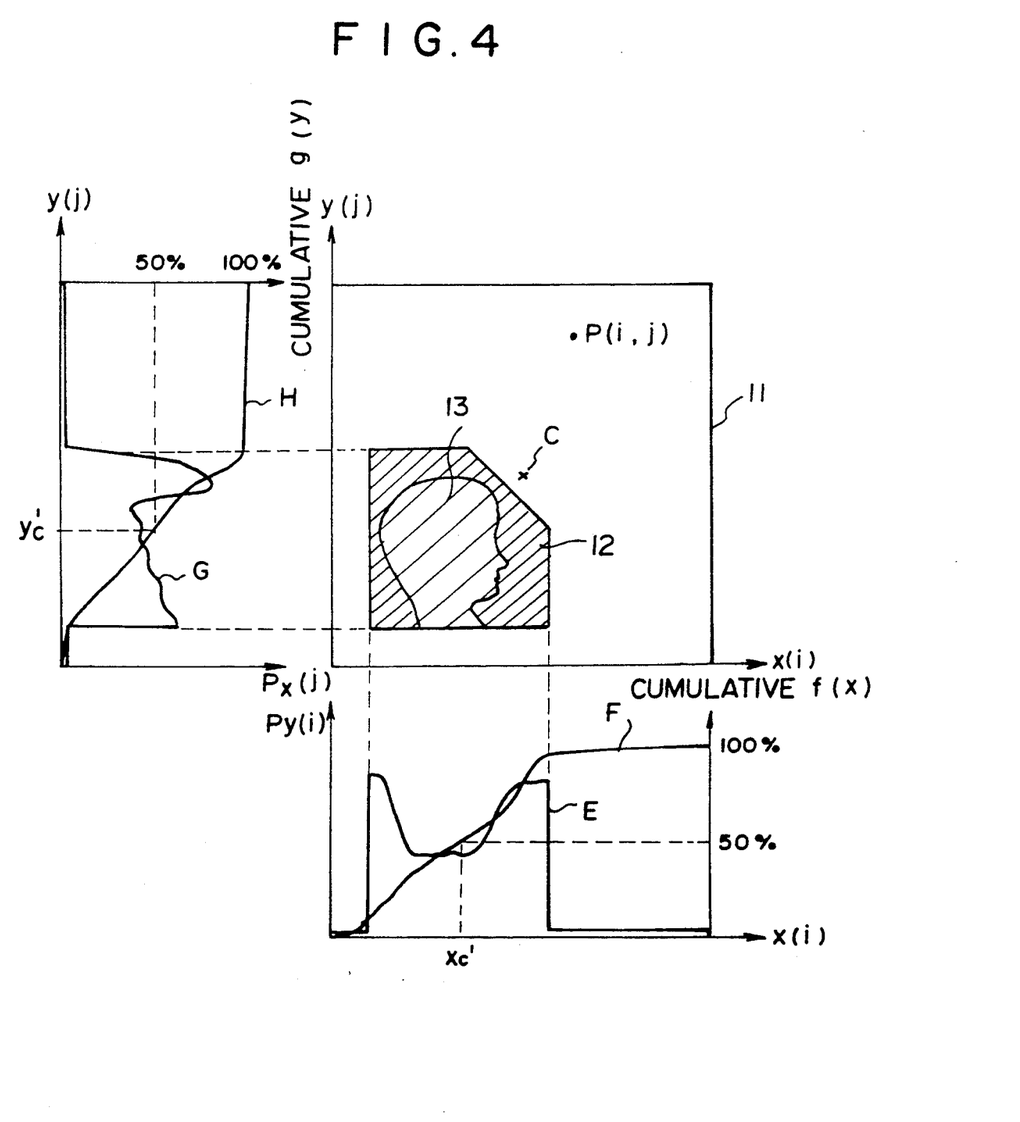
FIG. 4 is an explanatory view showing examples of the distributions of the image signal values along the x and y directions, and the distributions of the cumulative values of the image signal values along the x and y directions.

With reference to FIG. 4, the image signal values SQ or the reciprocals 1/SQ of the image signal values SQ, which have been selected in the manner described above and which correspond to the picture elements having the coordinates (i,j), are denoted by P(i,j).

Curve E indicates the values which are expressed as $$Py(i) = {}_j\Sigma P(i,j)$$

and plotted along the x direction (i direction). Curve G indicates the values which are expressed as $$Px(j) = {}_i\Sigma P(i,j)$$

and plotted along the y direction (j direction). Curve F indicates the cumulative values (%) of the values Py(i), which are indicated by curve E, along the x direction. Curve H indicates the cumulative values (%) of the values Px(j), which are indicated by curve G, along the y direction. Specifically, curves F and G indicate the values expressed as $$f(x) = \left( \sum_{i=1}^{x} Py(i) / \sum_{\text{all } i} Py(i) \right) \times 100 \quad (5)$$

$$g(y) = \left( \sum_{j=1}^{y} Px(j) / \sum_{\text{all } j} Px(j) \right) \times 100 \quad (6)$$

The coordinate points xc' and yc' along the x and y directions, respectively, are calculated with the formulas expressed as $$\sum_{i=1}^{x'} Py(i) = 0.5 \sum_{\text{all } i} Py(i) \quad (7)$$

$$\sum_{j=1}^{y'} Px(j) = 0.5 \sum_{\text{all } j} Px(j) \quad (8)$$

The coordinate points xc' and yc' coincide respectively with the points xc' and yc' shown in FIG. 4 at which the values of curves F and H reach 50%.

The coordinate point (xc',yc') found in the manner described above is determined as the image point in the object image.

After the temporary image point in the object image is obtained, it is determined whether or not the temporary image point is truly an image point in the object image by judging whether or not the density of the image at the image point is within the range of the density of the substantial object image. That is, it is judged whether or not the image signal value at the temporary image point is within the range of the image signal values which represent the substantial object image. This judgment is conducted by use of a comparator or the like, for example, to determine whether or not the image signal value at said temporary image point is included within the range between a first threshold value Th$_1$ which is smaller than the maximum value (Smax) by 15% and a second threshold value Th$_2$ which is larger than the minimum value (Smin) by 20% in the hystogram shown in FIG. 2C. Then, when it is included in said range, the temporary image point is determined as the image point in the object image.

The image point located in the object image is determined in the manner described above. Thereafter, along each of a plurality of radial directions each of which extends from the determined image point to an edge of the stimulable phosphor sheet 11, the image processing means 29 detects a prospective contour point, which is considered to be present on a contour of the irradiation field on the stimulable phosphor sheet 11, on the basis of the components of the image signal SQ corresponding to the picture elements arrayed along each direction. The image processing means 29 then recognizes the region surrounded by the lines, which connect the prospective contour points thus detected, as the irradiation field. After recognizing the irradiation field, the image processing means 29 carries out appropriate image processing on the image signal SQ corresponding to the region inside of the irradiation field.

In the aforesaid embodiments, the determined image point in the object image is utilized to recognize the irradiation field. However, the determined image point in the object image may be utilized for various purposes. For example, when an object image was recorded at the peripheral part of the stimulable phosphor sheet 11, a visible image may be reproduced by the reproducing means 30 shown in FIG. 1 so that the object image is located at the center part of the visible image. For this purpose, the image point in the object image determined by the image processing means 29 can be utilized.

The method for determining an image point in an object image in accordance with the present invention is also applicable when a preliminary read out is carried out in order to obtain a preliminary read-out image signal, an irradiation field is detected on the basis of the preliminary read-out image signal, and the read-out condition for the final read out is adjusted on the basis of the preliminary read-out image signal corresponding to the region inside of the irradiation field.

The present invention is not limited to the aforesaid embodiment wherein a stimulable phosphor sheet is used, and is also applicable to, for example, an X-ray image read-out apparatus wherein conventional X-ray film is used.

Figure 6:
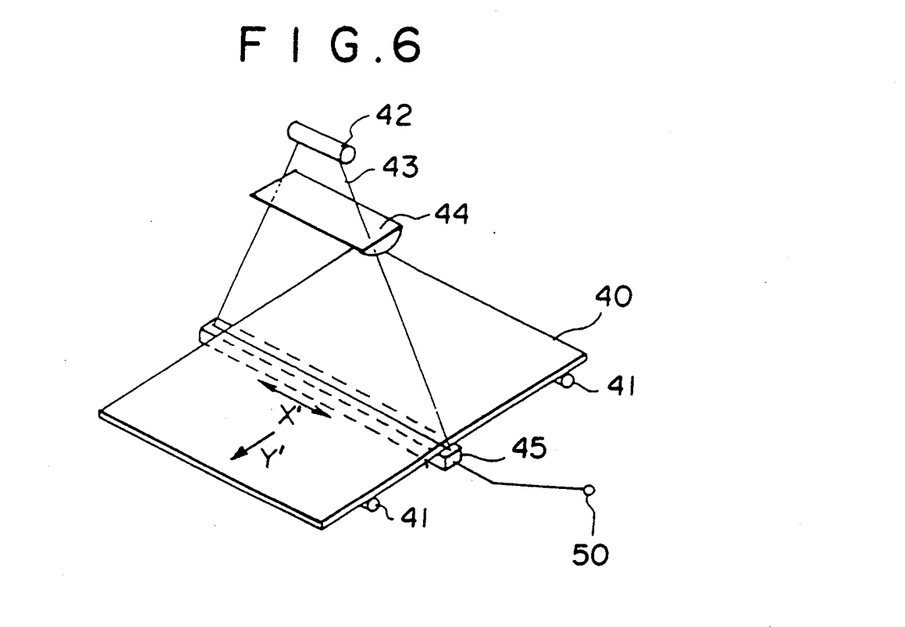
FIG. 6 is a perspective view showing an example of the X-ray image read-out apparatus wherein an X-ray image recorded on an X-ray film is read out.

With reference to FIG. 6, a sheet of X-ray film 40 on which an X-ray image including an object image has been recorded is placed at a predetermined position, and is conveyed in the direction indicated by the arrow Y' by a film conveyance means 41.

Reading light 43 produced by an elongated light source 42 extending in one direction is converged by a cylindrical lens 44, and is linearly irradiated onto the X-ray film 40 along the directions indicated by the arrow X', which are approximately normal to the direction indicated by the arrow Y'. A MOS sensor 45 is positioned below the X-ray film 40 so that the MOS sensor 45 can receive the reading light 43 which has passed through the X-ray film 40, the intensity of which light has been modulated in accordance with the X-ray image recorded on the X-ray film 40. The MOS sensor 45 comprises a plurality of solid state photoelectric conversion devices which are arrayed linearly at intervals equal to the intervals between the picture elements of the X-ray image along directions indicated by the arrow X'. As long as the X-ray film 40 is conveyed in the direction indicated by the arrow Y' while being exposed to the reading light 43, the MOS sensor 45 detects the reading light, which has passed through the X-ray film 40, at predetermined intervals corresponding to the intervals between the picture elements of the X-ray image along the direction indicated by the arrow Y'.

Figure 7:
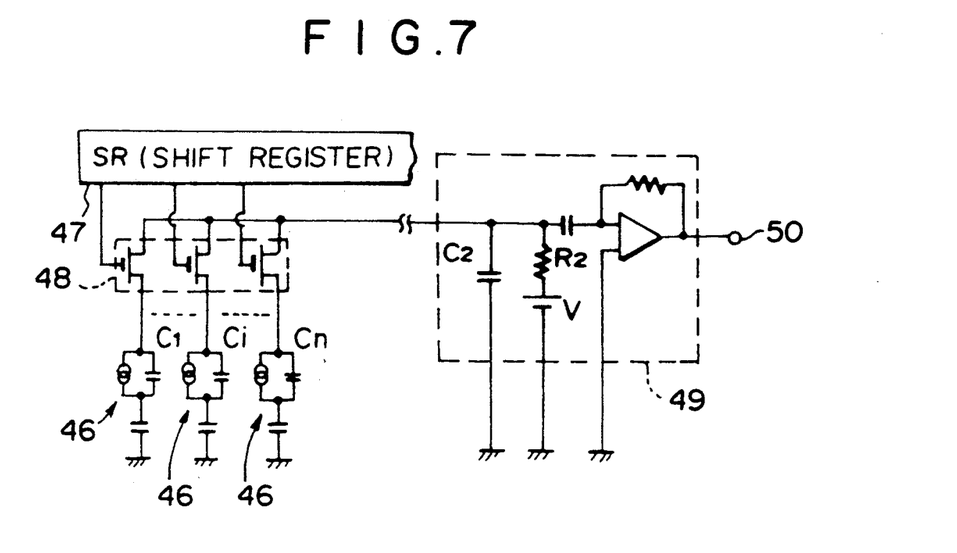
FIG. 7 is a circuit diagram showing an equivalent circuit for a MOS sensor.

FIG. 7 shows an equivalent circuit for the MOS sensor 45.

With reference to FIG. 7, photocarriers generated when the reading light 43 impinges upon the solid state photoelectric conversion devices 46, 46, ... accumulate in capacitors Ci (i=1, 2, ..., n) of the solid state photoelectric conversion devices 46, 46, ... The number of photocarriers which accumulate in the capacitors Ci is detected by sequentially turning on and off the switches of a switch section 48. A shift register 47 controls the switches of the switch section 48, and a time-serial image signal is obtained. The image signal is then amplified by a pre-amplifier 49 and is output at an output terminal 50 of the pre-amplifier 49.

The analog image signal output by the MOS sensor 45 is sampled and digitized into an image signal. Thereafter, the image point located in the object image is determined in the same manner as in the aforesaid embodiment, and the irradiation field is recognized on the basis of the determined image point. In the embodiment shown in FIG. 6, the MOS sensor 45 may be replaced by a charge coupled device (CCD) or a charge priming device (CPD). Also, the X-ray image may be read out from the X-ray film 40 by two-dimensionally scanning the X-ray film 40 with a light beam in the same manner as that described above for image read-out from the stimulable phosphor sheet. Furthermore, instead of detecting light which has passed through the X-ray film 40, light reflected by the X-ray film 40 may be detected.

The method for determining an image point in an object image in accordance with the present invention is applicable to various types of radiation image readout and reproducing apparatuses wherein an image signal is obtained by reading out a radiation image of an object from a recording medium, on which the radiation image has been recorded, and wherein a visible image is reproduced from the image signal.

I claim:

1. A method for determining an image point in an object image, which comprises the steps of:
    i) on the basis of an image signal comprising image signal components representing image information at respective picture elements on a recording medium on which a radiation image including an object has been recorded, arraying weighted values as one of image signal values, and the reciprocals of said image signal values so that the positions of said weighted values coincide with the positions corresponding to the respective picture elements,
    ii) accumulating said weighted values along each of two different directions on said recording medium and plotting the result cumulative values along each of said two different directions, thereby to find the distributions of the cumulative values along said two different directions,
    iii) detecting a coordinate point along each of said two different directions, at which point the cumulative value is approximately one half of the maximum cumulative value, from each of said distributions of the cumulative values, wherein a position on said recording medium, which position is defined by the coordinate points detected along said two different directions, corresponds to the image point in said object image.

2. A method for determining an image point in an object image, which comprises the steps of:
    i) on the basis of an image signal comprising image signal components representing image information at respective picture elements on a recording medium on which a radiation image including an object image has been recorded, performing one of weighting the respective picture elements by storing image signal values corresponding to the respective picture elements when said radiation image has been recorded on a subdivision portion of said recording medium with use of a radiation field stop, and weighting the respective picture elements by storing the reciprocals of said image signal values corresponding to the respective picture elements when said radiation image has been recorded on a substantial portion of said recording medium without use of a radiation field stop, so that the center of gravity of said recording medium can be found; and
    ii) determining the center of gravity of the object image, wherein a position, at which said center of gravity is located, corresponds to the image point in said object image, and wherein said recording medium is a stimulable phosphor sheet on which a radiation image has been stored, and said image signal is obtained by a read-out operation wherein said stimulable phosphor sheet is exposed to stimulating rays which cause it to emit light in proportion to the amount of energy stored during exposure to radiation, and the emitted light is detected photoelectrically.

3. A method for determining an image point in an object image, which comprises the steps of:
    i) on the basis of an image signal comprising image signal components representing image information at respective picture elements on a recording medium on which a radiation image including an object image has been recorded, arraying weighted values as one of image signal values corresponding to the respective picture elements, and the reciprocals of said image signal values so that the positions of said weighted values coincide with the positions of the corresponding picture elements,
    ii) accumulating said weighted values along each of two different directions on said recording medium, and plotting the resulting cumulative values along each of said two different directions, thereby to find the distributions of the cumulative values along said two different directions,
    iii) detecting a coordinate point along each of said two different directions, at which point the cumulative value is approximately one half of the maximum cumulative value, from each of said distributions of the cumulative values, wherein a position on said recording medium, which position is defined by the coordinate points detected along said two different directions, corresponds to a temporary image point,
    iv) judging whether or not the image signal value at said temporary image point is within the range of the image signal values which represents the substantial object image, and when it is within said range, said temporary image point is the image point in said object image.

4. A method for determining an image point in an object image, said method comprising the steps of:
    i) on the basis of an image signal comprising image signal components representing image information at respective picture elements on a recording medium on which a radiation image including an object image has been recorded, arraying weighted values, corresponding to the respective picture elements, as one of image signal values, and the reciprocals of said image signal values so that the positions of said weighted values thus arrayed coincide with the positions of the corresponding picture elements, ii) accumulating said weighted values along each of two different directions on said recording medium, and plotting the resulting cumulative weighted values along each of said two different directions, thereby to find the distributions of the cumulative values along said two different directions, iii) detecting a coordinate point along each of said two different directions, at which point the cumulative value is approximately one half of the maximum cumulative value, from each of each distributions of the cumulative values, iv) wherein a position on said recording medium, which position is defined by the coordinate points detected along said two different directions, corresponds to an image point in said object image, and wherein, after said image signal is detected, calculations are made based on said image signal to find a first representative value which is representative of the image signal values corresponding to the peripheral portion of said recording medium, and a second representative value which is representative of the image signal values corresponding to one of the overall area of said recording medium and approximately the center portion of said recording medium said first representative value and said second representative value being compared with each other, one of the image signal values and the reciprocals of the image signal values is selected for use as the weighted value in said arraying step in accordance with the results of the comparison, and the image point in said object image is determined on the basis of the weighted value.

5. A method for determining an image point in an object image, said method comprising the steps of:

i) on the basis of an image signal comprising image signal components representing image information at respective picture elements on a recording medium on which a radiation image including an object image has been recorded, arraying as weighted values, corresponding to the respective picture elements, one of image signal values, and the reciprocals of said image signal values so that the positions of said weighted values coincide with the positions of the corresponding picture elements, ii) accumulating said weighted values along each of two different directions on said recording medium, and plotting the resulting cumulative weighted values along each of said two different directions, thereby to find the distributions of the cumulative values along said two different directions, iii) detecting a coordinate point along each of said two different directions, at which point the cumulative value is approximately one half of the maximum cumulative value, from each of said distributions of the cumulative values, iv) wherein a position on said recording medium, which position is defined by the coordinate points detected along said two different directions, corresponds to an image point in said object image, and wherein said recording medium is a stimulable phosphor sheet on which a radiation image has been stored, and said image signal is obtained by a readout operation wherein said stimulable phosphor sheet is exposed to stimulating rays which cause it to emit light in proportion to the amount of energy stored during exposure to radiation, and the emitted light is detected photoelectrically.

6. A method of selecting an image point of an object image recorded on a recording medium, said selected image point representing a center of gravity of said object image and said object image being constituted of a plurality of pictures elements, the method comprising the steps of:

converting said object image into electrical signals representative of image values of said plurality of picture elements;

weighting each picture element of said object image by storing the respective electrical signal produced in said converting step corresponding to each picture element when said object image has been recorded on a subdivision portion of said recording medium with use of a radiation field stop, and weighting each picture element of said object image by storing the reciprocal value of the respective electrical signal produced in said converting step corresponding to each picture element when said object image has been recorded on a substantial portion of said recording medium; and processing said stored electrical signals representing weighted picture elements to determine which one of the stored electrical signals represents the picture element located at the center of gravity of said object image, wherein the image point corresponding to said center of gravity of said object image represents a point within the object image stored on said recording medium.

7. A method as defined in claim 6, wherein said recording medium is a stimulable phosphate sheet for storing a radiation image, and wherein said converting step comprises the steps of:

exposing said stimulable phosphor sheet to stimulating rays which cause said stimulable phosphor sheet to emit light in proportion to the amount of energy stored thereon during exposure to radiation; and photoelectrically detecting said light emitted from said stimulable phosphor sheet.

8. A method of selecting an image point of an object image recorded on a recording medium, said selected image point representing a center of gravity of said object image and said object image being constituted of a plurality of picture elements, the method comprising the steps of:

converting said picture elements into electrical signals representative of image values of said plurality of picture elements;

determining a first one of said electrical signals that corresponds to a first representative value which is representative of the image signal values corresponding to the peripheral portion of said recording medium, and determining a second one of said electrical signals that corresponds to a second representative value which is representative of the image signal values corresponding to one of the overall area of said recording medium and approximately the center portion of said recording medium;

comparing said first and second electrical signals thus determined;

weighting each picture element as a weighted value of said object image by performing one of storing the respective electrical signal produced in said converting step corresponding to each picture element, and storing the reciprocal value of the respective electrical signal produced in said converting step corresponding to each picture element, wherein said one of storing the electrical signal representative of the image signal values and the reciprocals of the image signal values is selected for use as the weighted value in said weighting step in accordance with the results of said comparing step; and processing said stored electrical signals representing weighted values to located the stored electrical signal corresponding to the center of gravity of said object image, wherein the image point in said object image corresponds to the weighted value found to be the center of gravity.

9. A method of selecting an image point of an object image recorded on a recording medium, said selected image point representing a center of gravity of said object image and said object image being constituted of a plurality of picture elements, the method comprising:

converting said picture elements into electrical signals representative of image values of said plurality of picture elements;

weighting each picture element of said object image by storing the respective electrical signal produced in said converting step corresponding to each picture element when said object image has been recorded on a subdivision portion of said recording medium with use of a radiation field stop, and weighting each picture element of said object image by storing the reciprocal value of the respective electrical signal produced in said converting step corresponding to each picture element when said object image has been recorded on a substantial portion of said recording medium;

processing said stored electrical signals representing weighted picture elements to locate the stored electrical signal corresponding to the center of gravity of said object image, wherein the image point in said object image corresponds to the weighted picture element found to be the center of gravity;

comparing an image value of said electrical signal corresponding to the picture element representing the center of gravity of said object image to a predetermined image value corresponding to a predetermined image density; and judging said picture element representing the center of gravity as a true image point in said object image when said image value is larger than said predetermined image value.

* * * * *